March 18, 1958 S. HAMILTON 2,826,828
VARIABLE DIFFICULTY DEVICES
Filed Aug. 22, 1951 9 Sheets-Sheet 1
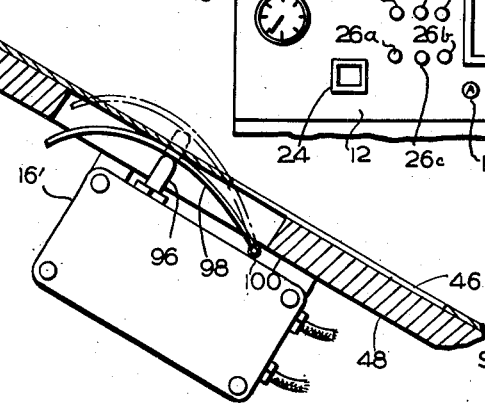
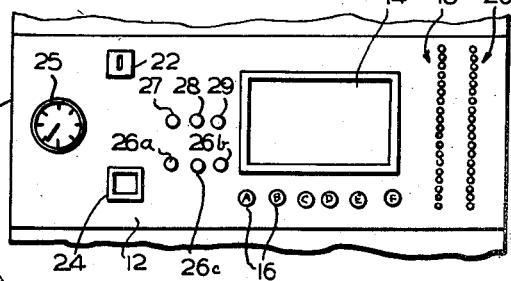
INVENTOR
SANBORN HAMILTON
BY Cushman, Darby & Cushman
ATTORNEY March 18, 1958 S. HAMILTON 2,826,828
VARIABLE DIFFICULTY DEVICES
Filed Aug. 22, 1951 9 Sheets-Sheet 2

INVENTOR
SANBORN HAMILTON
BY Cushman, Darby & Cushman
ATTORNEY

March 18, 1958 S. HAMILTON 2,826,828
VARIABLE DIFFICULTY DEVICES
Filed Aug. 22, 1951 9 Sheets-Sheet 3
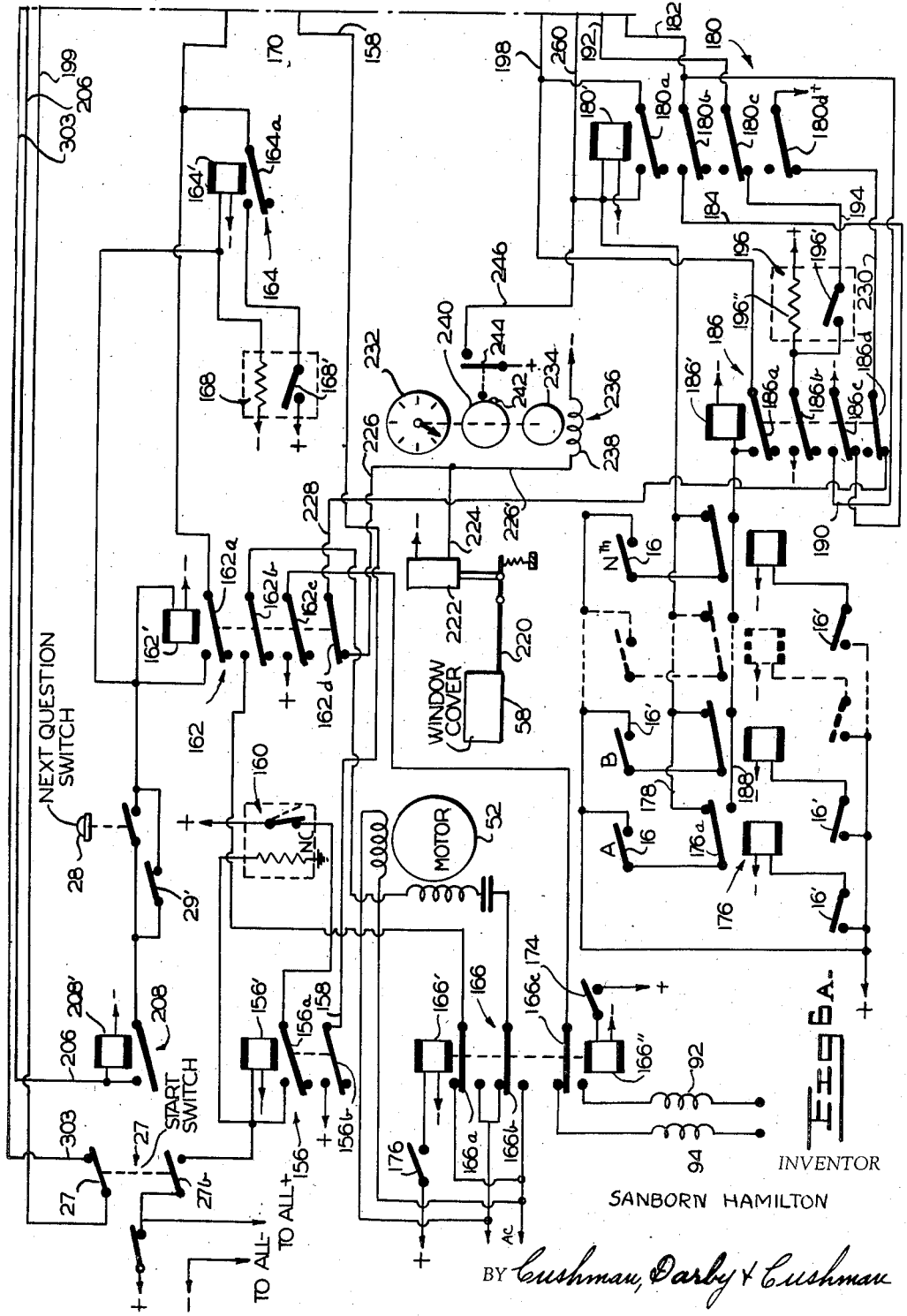
INVENTOR
SANBORN HAMILTON
BY Cushman, Darby & Cushman
ATTORNEY

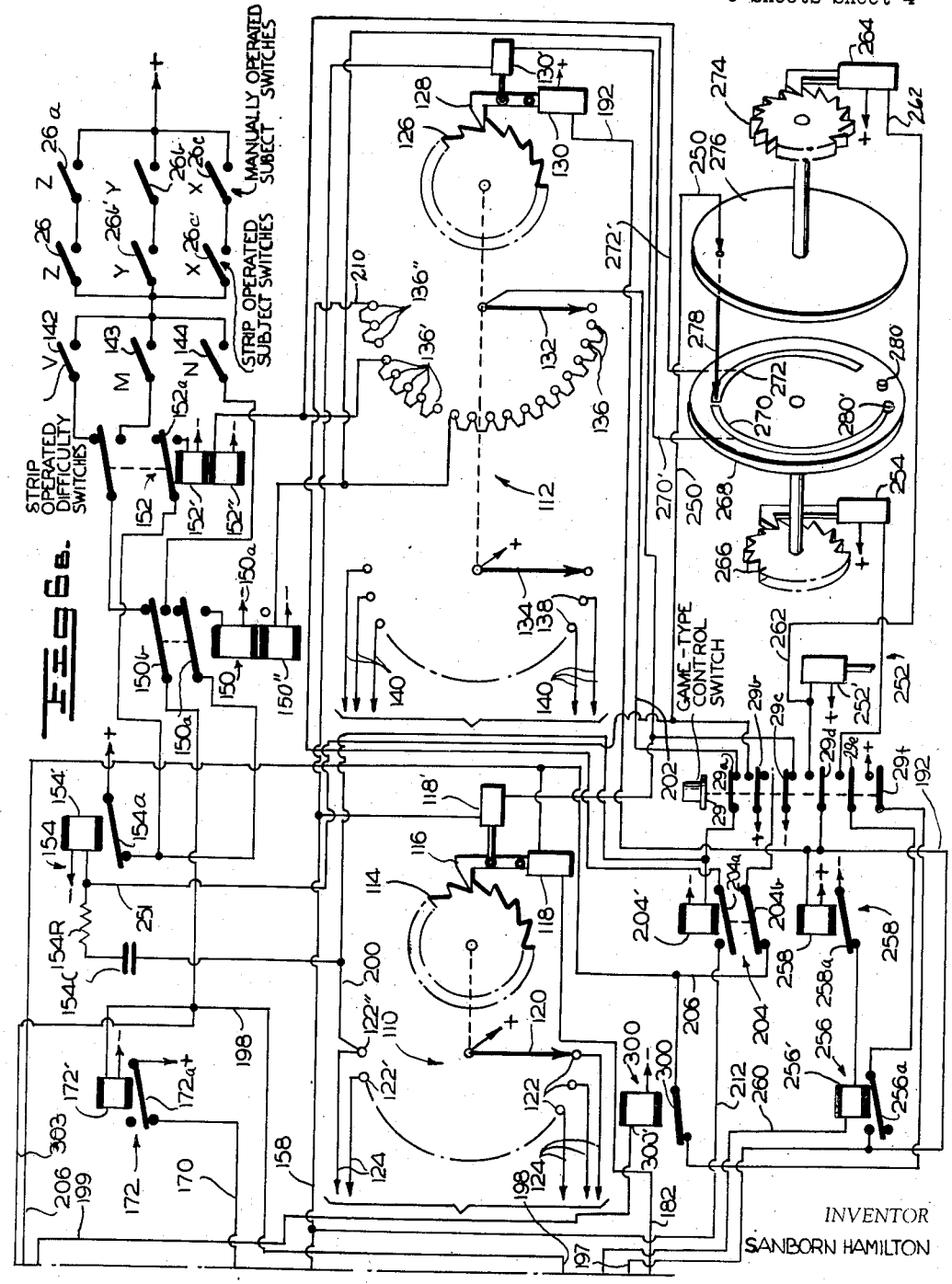

March 18, 1958 S. HAMILTON 2,826,828
VARIABLE DIFFICULTY DEVICES
Filed Aug. 22, 1951 9 Sheets-Sheet 5
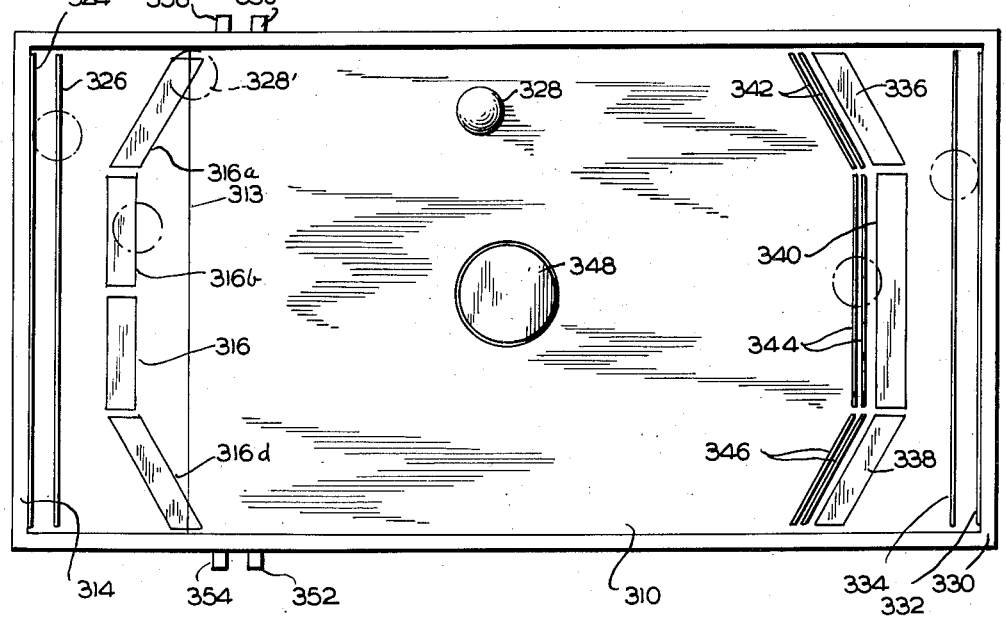
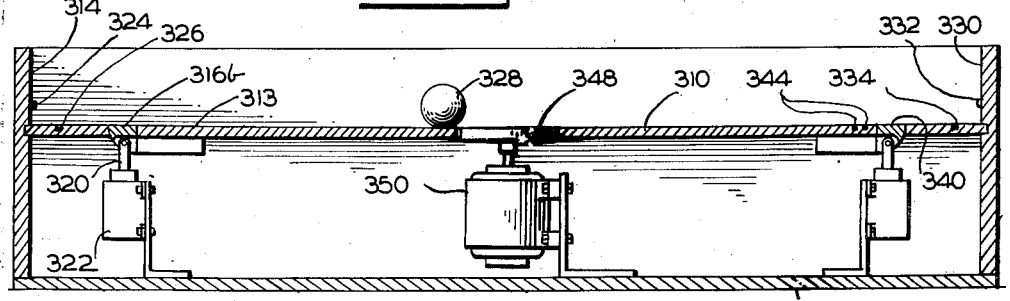
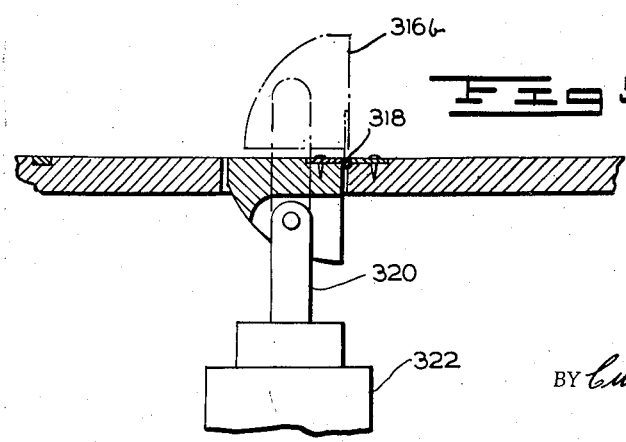
INVENTOR
SANBORN HAMILTON
BY Cushman, Darby & Cushman
ATTORNEY

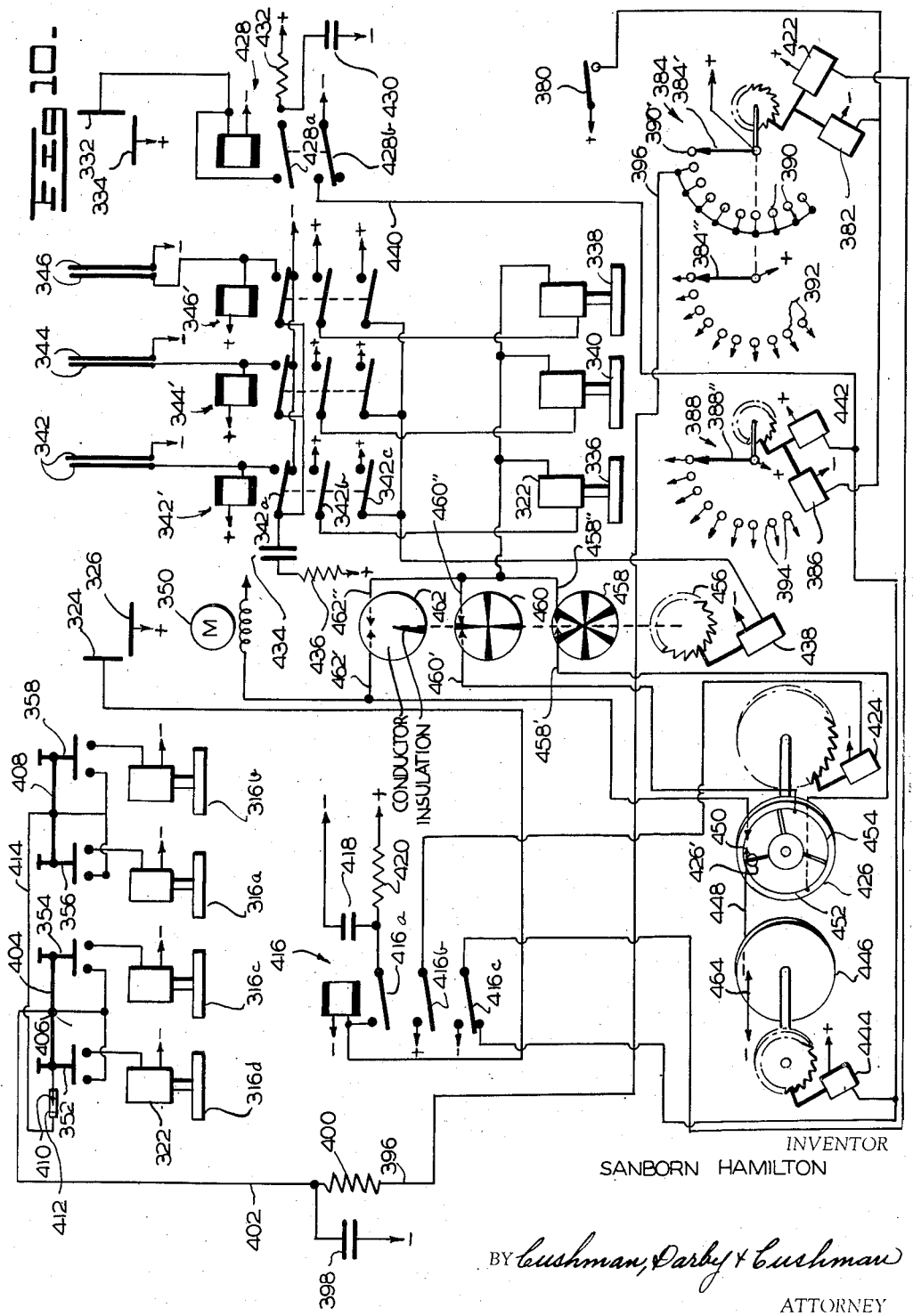

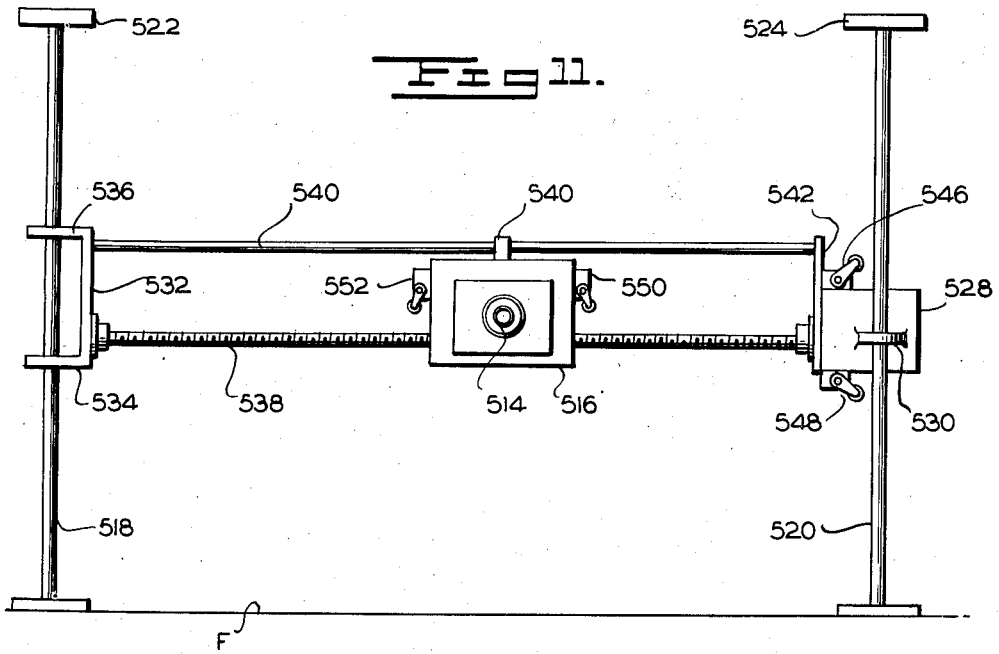
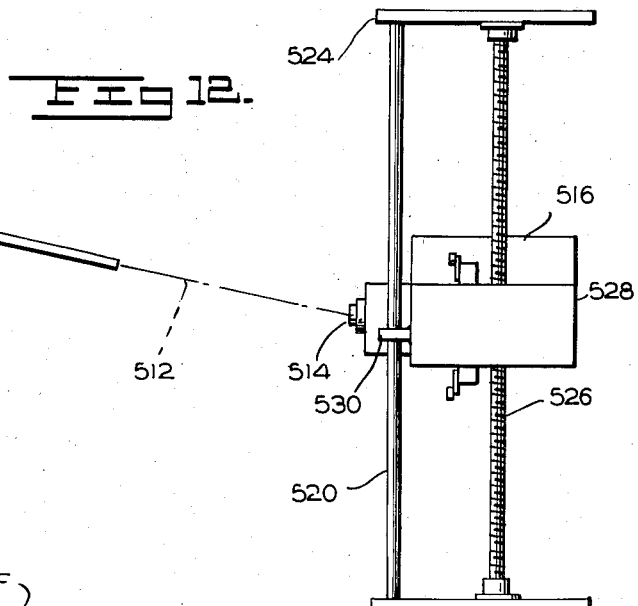

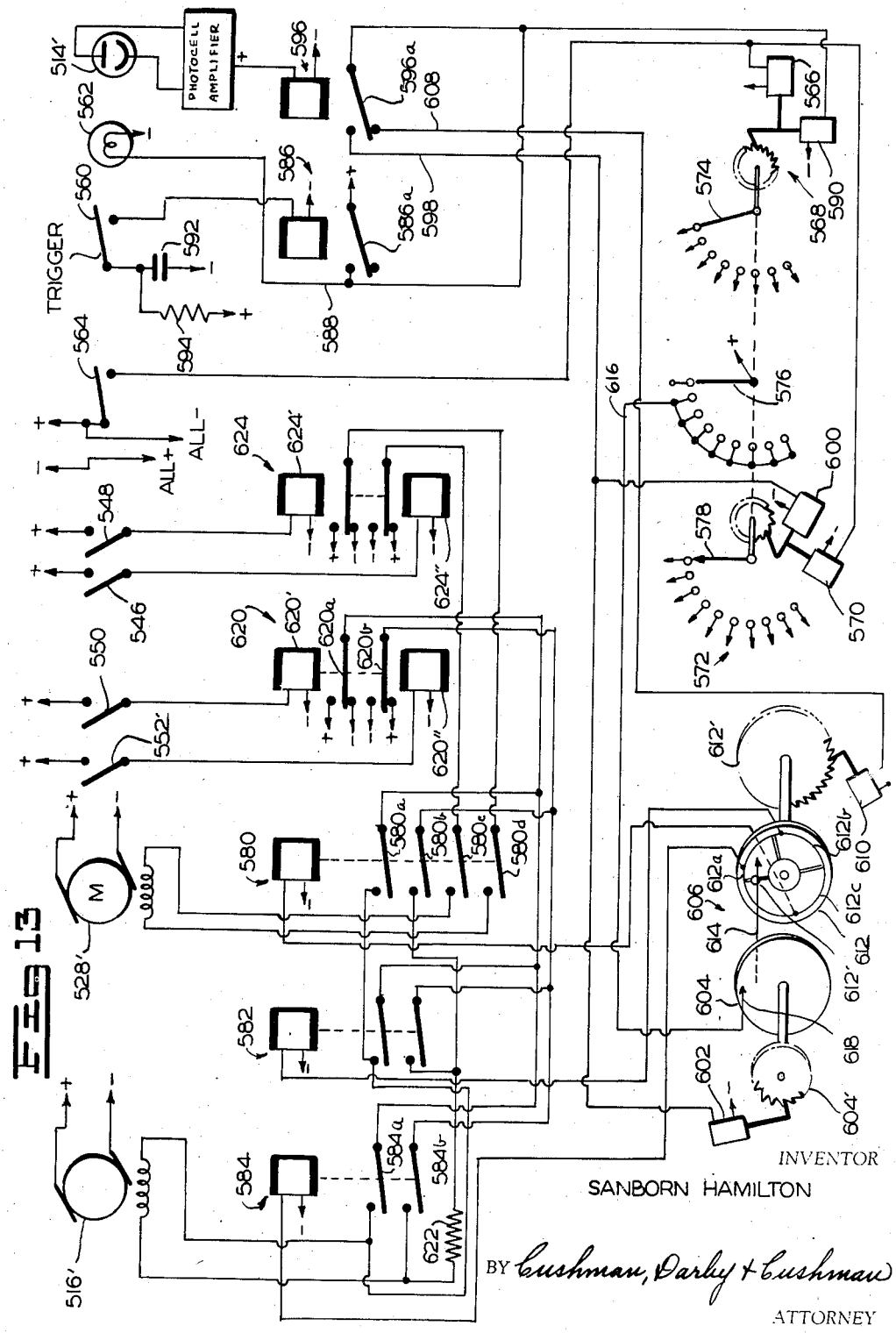

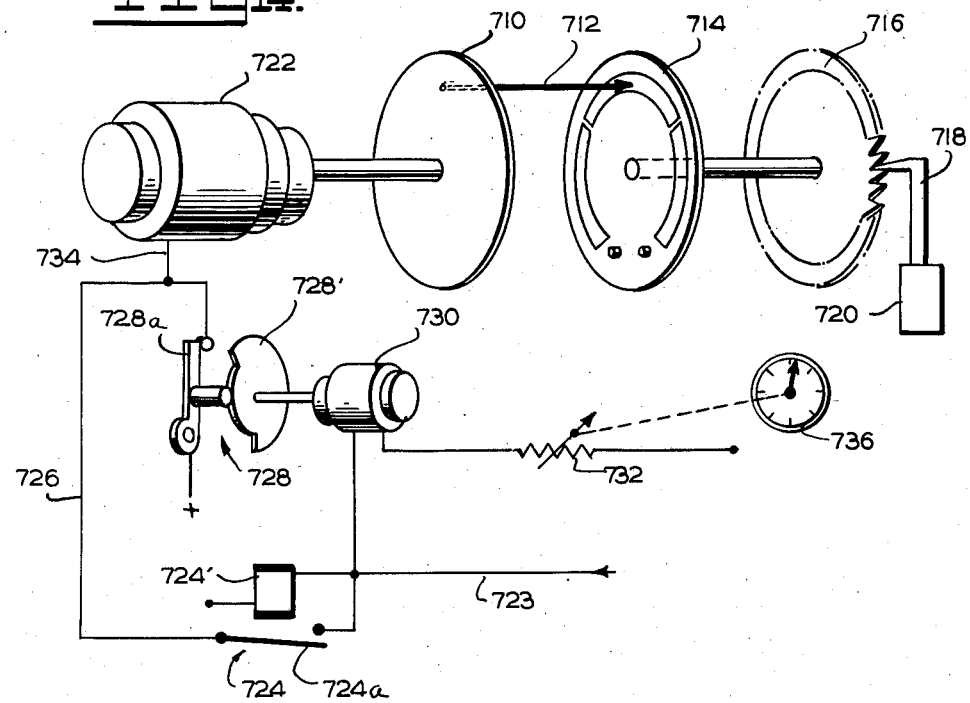
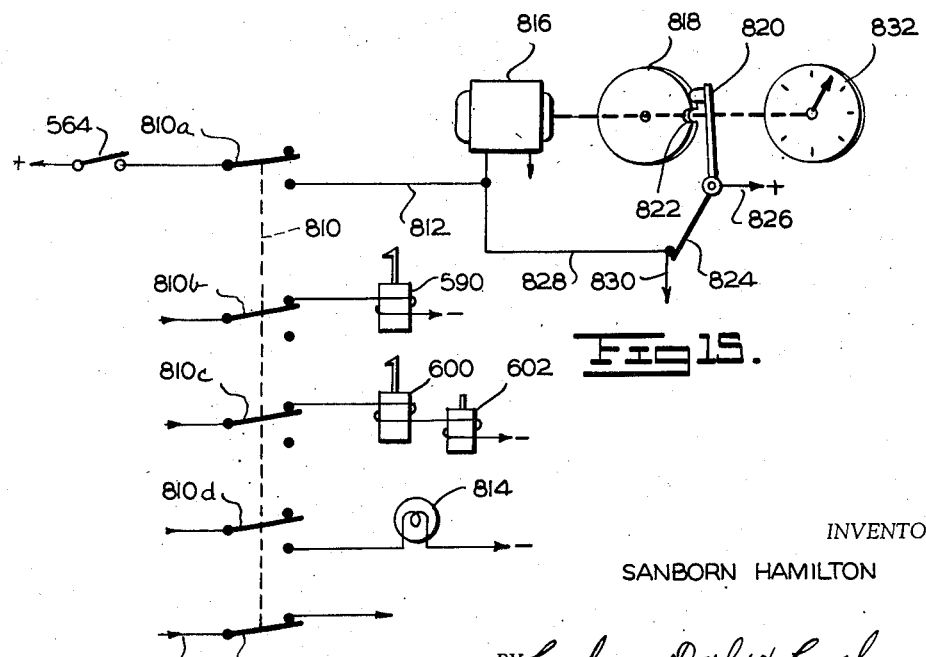

United States Patent Office 2,826,828
Patented Mar. 18, 1958

2,826,828

VARIABLE DIFFICULTY DEVICES

Sanborn Hamilton, Washington, D. C.

Application August 22, 1951, Serial No. 243,118

22 Claims. (Cl. 35—9)

This invention relates to apparatus involving skill in the operation thereof, an example of such apparatus being a game of skill in which the difficulty of operation presented to a player may be automatically varied in accordance with the results obtained.

I will herein below describe my invention as it may be embodied in several different types of devices, these relating to devices involving mental and physical skill, or a combination of both. The use of the word "skill" in the appended claims is, therefore, intended to be generic to the concept of either physical or mental skill, or both.

Accordingly, the principal object of my invention is to provide apparatus offering aid and stimulus to those people who desire the challenge of exercising their skill for purposes of recreation, amusement or eduction.

When in the form of a game, it is possible to control the use of the game by means of a check or coin. Therefore, it is a further object of my invention to provide an improved check or coin-controlled game apparatus embodying the concepts of my invention as herein described.

One form which my invention may take is a question and answer game. Accordingly, it is another object of my invention to provide a game apparatus in which the difficulty of questions presented to a player from a chosen subject may be varied to a greater or lesser extent with the intelligence and mental skill of the player.

Another form which my invention may take is a paddle board game. Accordingly, it is yet another object of my invention to provide a paddle board game in which the difficulty of operation experienced by a player in operating paddles varies according to the results attained.

The invention may also be embodied in the target game where the operator aims and fires a gun at a target. Accordingly, it is yet another object of my invention to provide such a target game wherein the target is made to be more difficult to hit, depending on the skill of the player.

A further object of my invention is to provide apparatus of the foregoing types wherein a predetermined high level of success may afford an additional or "free" game or additional discrete operations or the like.

A further object of my invention is to provide a ratio discriminator device for use in devices of the foregoing described type, or in other varieties of apparatus such as computing devices and the like.

Further objects and advantages will appear more fully in the following detailed description and in the appended claims.

The invention may be best understood with reference to the accompanying drawings, in which:

Figure 1 is a plan view of the mechanical components of my game device utilized for controlling the movements of the question or intelligence-bearing strip;

Figure 3 is a view illustrating details of the question or intelligence-bearing strip;

Figure 5 is a view illustrating the details of a switch operated by apertures in an intelligence-bearing strip;

Figure 2:
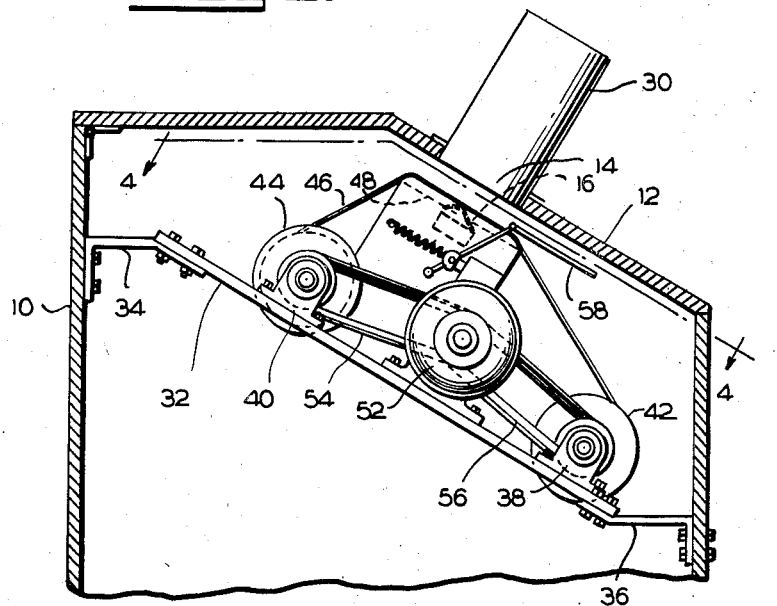
Figure 2 is a side view partly in section of the mechanical components shown in Figure 1.

Figures 6A and 6B constitute a schematic diagram of an electrical circuit employed in connection with the apparatus of Figures 1–5;

Figure 7 is a plan view of a paddle board game device;

Figure 8 is a cross-sectional view of the device shown in Figure 7;

Figure 9 is a detailed view of a paddle employed in the apparatus of Figures 7 and 8;

Figure 10 shows an electric circuit employed with the paddle board device of Figures 7–9;

Figure 11 shows a front view of a target game device;

Figure 12 shows an end view of the target game device in Figure 11;

Figure 13 shows an electric circuit employed with the target game device of Figures 11 and 12;

Figure 14 shows a ratio discriminator for use with my invention, this discriminator having a variable ratio feature; and Figure 15 shows a time delay arrangement for providing a preliminary orientation period in the operation of games or other devices embodying my invention.

As above mentioned, the phase of the basic invention, wherein the difficulty of a game of skill increases or decreases with the player's ability, may take several forms. Three such forms, herein referred to as species, will now be described, in detail.

The invention as embodied in a question and answer educational game device will first be described. This device, involving mental skill, is of the type where the operator views a printed question and possibly multiple choice answers through a viewing window, operating switches being provided so that a switch believed to correspond to the correct answer may be operated by the player. Stock answers, such as "true" and "false," may be designated by the operating switches, in lieu of printed answers. The illustrated embodiment of the game may be organized to operate in one of two manners, the first being that after completion of a set of questions constituting a "game," there may be an extra game awarded if the percentage of correct answers was high. The other way of operating the game is to have a coin or card returned each time an individual question is answered correctly.

Referring to Figure 1, the question and answer device may be contained within a cabinet 10 having a sloping front panel 12 in which a question viewing window 14 is provided. Beneath the window 14 are a plurality of push button switches 16 lettered A—B, by use of which the operator can designate an answer believed to be correct. Also provided on panel 12 is a first vertical column 18 of indicating lamps which, starting from the bottom, will indicate the total number of questions answered, either correctly or incorrectly. A second vertical column 20 of indicating lamps will indicate, starting from the bottom, the number of questions answered correctly. There are sufficient lamps in columns 18 and 20 to accommodate a full game. Upon completion of a game it will be necessary to start a new game.

There may also be provided on panel 12 a coin or card insert slot 22 and a coin or card return slot 24. In addition, a timer 25 is provided to indicate elapsed time in answering questions. There is also on panel 12 a group of three push button switches 26a, 26b and 26c for selecting the subject matter of questions to be answered and there is another set of switches designated 27, 28 and 29 for controlling the operation of the device in a manner to be described more fully below.

Referring now to Figure 2, this figure shows a cross-sectional view of cabinet 10. The window 14 may be surrounded by a viewing hood 30 through which the operator may view questions, but other persons standing nearby will be prevented from seeing the questions. Located within cabinet 10 and substantially parallel to panel 12 is a supporting plate 32 attached to the vertical sides of cabinet 10 by suitable brackets 34 and 36. Mounted in suitable bearing blocks 38 and 40 on plate 32 is a first question strip reel 42 and a second reel 44 between which a question strip 46 is moved. The question strip 46 is a flat tape-like member which will be fully described below. The strip 46 passes over a support platform 48 directly aligned with the viewing window 14. Aligned with the center of the viewing window 14, but placed at one side thereof are a plurality of strip-operated switches here designated 16'. As will be explained below, each of the switches 16' will be operated by an aperture or other indicia appearing in the strip 46. The reels 42 and 44 are arranged to be reversibly driven by a motor 52 and belts 54 and 56. There is also provided a window cover 58 which may be operated from a position shown in Figure 2 into an advanced position where it is beneath the window 14. As will be explained below, the cover 58 obscures the question strip 46 whenever the strip is moving between questions and at certain other times.

Referring next to Figure 3, the arrangement of the question strip 46 may be understood. The strip 46 will be an elongated width of relatively heavy weight paper or the like divided into a first major portion devoted to carrying printed questions and multiple-choice answers. This portion of the strip is designated by the legend "questions" in Figure 3. As may be noted in this figure, each question is within a block of the strip which will be substantially the size and configuration of the viewing window 14. The remainder of the strip to the side of each of the question blocks is devoted to carrying apertures 70 arranged in predetermined ones of a plurality of paths or tracks 72 extending along the strip 46.

While the blocks containing the questions and the tracks 72 containing the apertures are marked on the strip in Figure 3, it will be understood that such outlined marks are not necessary for the practice of the invention, but may facilitate preparation of the strip.

As illustrated in Figure 3, each question block contains 6 multiple-choice answers designated as A, B, C, D, E or F. An equal number of the tracks 72 are correspondingly designated A—F and the particular track representative of the correct answer has an aperture 70 therein. These tracks 72 devoted to answers A—F are designated by the legend "answers" in Figure 3.

It will be understood that there may be more or less than six selections, this number being shown only for purposes of illustration. It will further be understood that suggestive answers need not be printed for each question.

For each question, in addition to an aperture in one of the six answer tracks, there will also be an aperture in one of three tracks relating to the difficulty of the questions. These tracks are designated by the legend "difficulty" in Figure 3, each track being designated either N, M, or V. These letters are intended to represent questions which are (1) not difficult, (2) of medium difficulty, and (3) very difficult.

The strip 46 also contains three tracks devoted to the selection of the subject matter of the questions. One of these three tracks will be provided with an aperture 70 for each question block. In Figure 3 these tracks are designated by the legend "subject" and the individual tracks are lettered X, Y and Z.

It will be understood that the group of apertures for a given question need not be placed in side-by-side alignment with the question blocks to which they appertain. That is, there can be a stagger distance if it is not desired that the switches 16' which operate in the apertures be located immediately beside the viewing window 14. However, for purposes of illustration, it is preferable to have the apertures aligned with the question blocks.

There are also two additional tracks on strip 46, these being designated as 72' and 72". These tracks are employed for controlling the reversing of the question strip 46 as it runs between the reels 42 and 44. An aperture will be located in track 72' near one end of the strip and a similar aperture will be located in track 72" near the other end of the strip. As will be described more fully below, suitable switches are provided for cooperation with the apertures in tracks 72' and 72" for controlling the reversible motor 52 which drives the reels 42 and 44.

From the foregoing, it will be understood that for each question there will be an aperture 70 in one of the tracks A—F representative of the correct answer. There will also be an aperture 70 in one of the tracks representative of the subject selected and also one aperture 70 in one of the three tracks relating to the difficulty of the question selected. As will become further apparent below, the player will make a selection of a subject by means of switches connected in a form of series relationship with aperture-operated switches 16' operated by the "subject" tracks. The motor 52 will operate and eventually the aperture-operated switch in the selected track will close. Thereupon, a circuit will be completed through a difficulty channel as determined by the "difficulty" aperture-operated switches and the question strip will be stopped with a question of selected subject matter and difficulty appearing in the viewing window 14. The player will then operate one of the switches 16 (see Figure 1) and if his selection is correct, a correct answer will be indicated by the lighting of one of the lamps of both columns 18 and 20.

Figure 4:
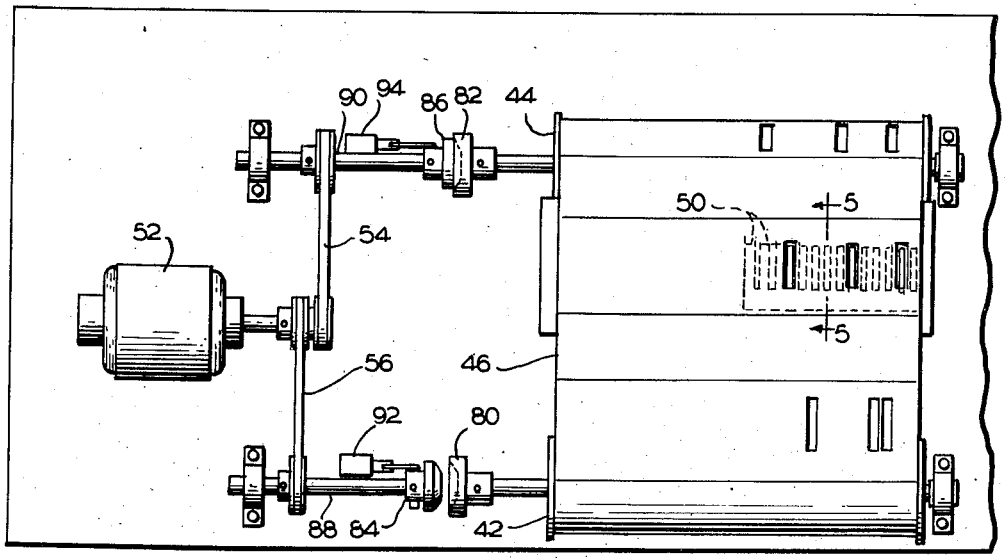
Figure 4 is a view taken along the line 4—4 of Figure 2, showing a plan view of a motor drive and reels.

Referring to Figure 4, the manner of reversibly driving the reels 42 and 44 may be understood. The motor 52 is reversible and may be so controlled in a manner to be described more fully below. The reels 42 and 44 have attached thereto driven clutch discs 80 and 82, respectively, these clutch discs being positioned for operation with driven clutch discs 84 and 86, respectively. The discs 84 and 86 are mounted on shafts 88 and 90, respectively, which are driven by the previously mentioned belts 54 and 56 which are, in turn, driven by the motor 52. The clutch discs 84 and 86 are arranged to be operated into and out of engagement with their companion clutch discs 80 and 82 by means of solenoid units 92 and 94.

Referring next to Figure 5, the switches 16' may be understood in greater detail. Each switch is mounted by any suitable means on the lower surface of plate 48 and is provided with a plunger 96 which is operated by a curved operating leaf 98 pivoted to the switch at 100. When no aperture appears in the strip 46 the leaf 98 will be depressed into the full line position, as shown in Figure 5, and the switch contacts will be held open. However, whenever an aperture 70 is present the leaf 98 will be extended under convenient spring action into the chain line position in Figure 5 and the switch contacts will be closed.

Suitable circuits for controlling the above described mechanical features of the invention will now be explained in detail with reference to Figures 6A and 6B. Figures 6A and 6B are arranged to join between the right-hand end of Figure 6A and the left-hand end of Figure 6B.

The circuit of Figures 6A and 6B is characterized by the provision of a first stepping switch designated generally as 110 and a second stepping switch designated generally as 112. The stepping switch 110 consists of a ratchet wheel 114 arranged to be operated by a pawl 116 which may be intermittently actuated by stepping solenoid 118 to rotate the wheel 114 in a clockwise direction as viewed in Figure 6B. Attached to wheel 114 for rotation therewith is a switch arm 120 arranged to engage successive contacts 122 arranged in an arcuate path. Conductors 124 connected to each of the contacts 122 are provided for connection with the lamps of the column 18 mounted in panel 12, which lamps indicate the total number of questions which have been answered either correctly or incorrectly.

The stepping switch 112 consists of ratchet wheel 126 operated by pawl 128 which is, in turn, operated by stepping solenoid 130. Attached to wheel 126 for rotation therewith is a first switch arm 132 and a second switch arm 134. The first switch arm 132 is arranged to engage a series of contacts 136 for controlling the difficulty of questions to be selected and the second switch arm 134 is arranged to engage a series of contacts 138. The contacts 138 are arranged for connection over lines 140 to the lamps of the column 20 on panel 12, these lamps only indicating the number of questions correctly.

The switches 16 for selecting correct answers are correspondingly identified in Figure 6A. As indicated in Figure 6A, there may be any number of switches, depending on the design of the particular machine. Also illustrated in Figure 6A is the motor 52 which drives the question strip 46. The switches employed to select the difficulty of questions are correspondingly designated in Figure 6B as 26a, 26b and 26c, these switches controlling subjects X, Y and Z, respectively.

In Figures 6A and 6B the circuit is shown as energized by a direct current source (+ and —) for control circuits, and an alternating current source for driving the motor 52. However, it will be understood that the complete supply may be direct or alternating, as desired.

As indicated in the foregoing, the game is controlled jointly, in addition to stepping switches 110 and 112, by a plurality of switches operated by the player and a plurality of switches operated by the question strip 46. The player-operated switches are as follows: switches 26a–c (Figure 6B) for selecting the subject matter of the questions; switch 27 (Figure 6A)—employed to start a game—this may be coin or card operated; switch 28 (Figure 6A)—manually operated to bring a new question into the viewing window 14; switch 29 (Figure 6B)—to determine if the game will be played to provide an extra or free game on receiving a high score on a previous game or to provide a free question for each question answered correctly; and switches 16 (Figure 6A)—to designate selected answers.

The question strip operated switches are as follows: switches 26a', 26b' and 26c'—operated by apertures in the "subject" tracks of the strip 46; switches 142, 143 and 144—operated by the "difficulty" tracks of strip 46, and switches 16'—operated by apertures in the "answer" tracks of strip 46.

In Figures 6A and 6B all relay arms are shown in the position they will occupy when the relay coils are not energized; the bimetallic elements of thermal delay circuits are shown in their unheated positions and aperture-operated switches are shown in open position, as when no aperture is present adjacent a switch.

The foregoing explanation of the circuit symbols of Figures 6A and 6B also applies to other circuits described herein.

Referring again to Figures 6A and 6B, it will first be assumed that a game of the "free game" type has previously been played and, therefore, the circuit has retained certain results of that game, namely, (1) that either a "not difficult" relay 150 or a "medium difficult" relay 152 remains energized by reason of holding circuit through arm 154a of a "result memory" relay 154, and (2) that the switch arms 120, 134 and 132 are retained in their positions of the last question of the previous game.

Switch 29 will be set in its lower position as shown in Figure 6B to cause the game to be of the "free game" type.

To start a new game the player will insert a coin or card (if required) to momentarily close the start switch 27. Doing so, will energize coil 156' of a "reset" relay 156. As a result, a positive potential will be applied through relay arm 158b and over a line 158 to reset stepping switches 110 and 112. This action is by means of reset solenoids 118' and 130'. Reset relay 156 will be deenergized after a brief delay by reason of a bimetal element 160' of a thermal reset delay circuit 160 opening the holding circuit through relay arm 156a.

The player will next momentarily operate switch 28 to select a first question. Closing of switch 28 will energize a motor control relay 162 and this relay will be held closed for a few seconds by reason of a positive potential available through arm 164a of a motor movement delay relay 164, relay coil 164' also having been energized along with relay coil 162'.

At the instant relay 162 operates the strip motor 52 will begin to revolve, deriving current through arm 162b. The direction of rotation of motor 52 will be determined by the position of relay arms 166a and 166b of a motor reversing relay 166.

Following a brief interval of time necessary for motor 52 to move the strip 46 so that the apertures in the strip have moved away from the "answer," "difficulty" and "subject" switches, a holding circuit previously existing through arm 164a of motor delay relay 164 will open due to bending of a bimetallic element 168' of motor delay, opening delay circuit 168. Coil 164' of relay 164 and coil 162' of relay 162 will then be deenergized from this source, but a holding circuit for relay coils 162' and 164' will be available over a line 170 connected with the now non-operated arm 172a of a motor stop relay 172.

The motor 52 will continue to run until relay 162 opens by reason of the motor stop relay 172 being energized. Relay 164 will open before the bimetal element 168' has time to cool.

In the event the "next question" does not appear before the end of the strip is reached, an aperture in the track 72' of strip 46 will eventually close a "front" limit switch 174. Actuation of switch 174 will energize coil 166" of motor reversing relay 166 to move arms 166a–c to their lower positions to reverse motor 54, and, in the case of arm 166c, to deenergize the "front" clutch solenoid 94 and energize the "rear" clutch solenoid 92.

The relay 166 may be of a type which will remain in one position until again energized to move it to its other position. Accordingly, the motor will remain "reversed" until, at a later time, a "rear" limit switch 176 is closed by an aperture in track 72" at the other end of strip 46.

Somewhere, during the travel of strip 46, an aperture in the "subject" tracks will coincide with the subject selected by the player and an aperture in the "difficulty" tracks will coincide with the "difficulty" of the previous game as retained by the machine in relays 150 and 152. At such place, a positive potential will be available through relay arms 152b and 150b to energize the coil 172' of motor stop relay 172. At this moment, the holding potential on line 170 will be removed and this causes relay 162 to drop out to stop motor 52.

The question strip 46 is now stopped so that the player can read the question and prepare to operate an "answer" switch 16.

Having read the question, the player may do one of three things, namely, (1) he may close an incorrect answer switch, (2) he may close the correct answer switch, or (3) he may operate more than one (probably all) of the answer switches, hoping to confuse the circuit and have a correct answer registered. These three situations will now be taken up in turn.

Assuming that B is the correct answer, if the player operates switch A of switches 16 (the result would be the same for C—F), a positive potential will be applied through arm 176a of an answer relay 176 associated with answer A. This potential will appear on an "incorrect answer" line 178 because the coil 176' is not energized.

The potential on line 178 will energize the coil 180' of an incorrect answer relay 180. When this occurs the relay arms 180a–d will be moved to engage their upper contacts. One result is that a negative potential is applied through relay arm 180b and over line 182 to energize the solenoid 118 of stepping switch 110. The negative potential available on line 182 is derived over line 184 through arm 186c of relay 186. Accordingly, the arm 120 of stepping switch 110 will be moved to the second from the lowermost contact 122 and the bottom lamp of column 18 on panel 12 will be lighted to indicate that one question has been answered. Since the second lamp of column 20 is not lighted, an incorrect answer is apparent.

Next, assuming that the player operates the correct answer switch 16, which now will be assumed to be A; in this instance, an aperture in the A answer track of strip 46 will have closed the switch 16' associated with previously mentioned relay 176 so that the coil 176' of this relay is energized and the relay arm 176a is moved to engage its lower contact. Now, if the A switch 16 is closed, a positive potential will be applied to a "correct answer" line 188 and this potential will serve to energize the coil 186' of correct answer relay 186. When this occurs, the relay arms 186a–d will be moved to engage their upper contacts and in so doing relay arm 186c will transfer its available negative potential to a line 190 which interconnects with the previously mentioned line 182. The result of this is that the solenoid 118 of stepping switch 110 is again operated to move the switch arm 120 to the next higher contact 122 to indicate that another question has been answered. However, in this instance, the solenoid 130 of stepping switch 112 is also energized to step the arm 134 to engage the second of contacts 138 to indicate that a question has been answered correctly. The necessary negative potential to operate solenoid 130 is obtained over line 192 connected with arm 180c of relay 180. Since in this instance the relay 180 is not energized, the arm 180c engages its lower contact which is connected over line 194 with the bimetallic element 196' of a correct answer thermal delay circuit 196. Bimetallic element 196 is normally opened and, therefore, the negative potential over lines 194 and 192 for energizing the correct answer solenoid 130 will not be available until the heater element 196" of delay circuit 196 has been heated due to current flowing through the arm 186b of correct answer relay 186. The invention of delay circuit 196 prevents an erroneous operation of solenoid 130 in the event that both correct and incorrect switches 16 have been operated.

Assuming now that the player operates two or more of the switches 16 in an attempt to confuse the system, both of relays 180 and 186 will be energized over lines 178 and 188, respectively. By the time bimetallic element 196' has been heated sufficiently to apply a negative potential to line 194, the relay 180 will have operated and the arm 180c will have disengaged from the line 194. Therefore, there will be no potential available on line 192 for operating solenoid 130 of stepping switch 112.

Once either or both of the relays 180 and 186 have been operated by reason of potential available through the answer switches 16, these relays are held in energized position by reason of a positive potential applied through the arms 180a and 186a by connection over a line 198 which carries a positive potential derived through the difficulty relays 150 and 152. The positive potential is available on line 198 as long as the question strip 46 remains unmoved.

As the player answers one question after another at least the stepping switch 110 will advance until finally the arm 120 engages the last contact 122". This finishes a game. At the same time, depending on the player's ability to answer the questions, the arms 132 and 134 of stepping switch 112 will have advanced a given number of contacts 136 and 138, respectively. There may be one of three results of the game, namely, (1) the arm 132 will be in contact with one of the contacts 136, indicating that only a few questions have been answered correctly and, therefore, the next game should select questions which are not difficult, (2) the arm 132 may be in contact with one of the contacts 136' indicating that the player has had medium success with the questions and the next game should select questions of medium difficulty, or (3) the arm 132 may engage one of the contacts 136" indicating that the player has been very successful and the next game should select questions which are very difficult.

Assuming first that the arm 132 engages one of the contacts 136, the engagement of arm 120 with contact 122" will apply a positive potential on a line 200 and this potential will be available through arm 29a of switch 29 and then over line 202 and through arm 132 to energize the operating coil 150" of the "not difficult" relay 150.

When relay 150 is energized a holding circuit for the relay will be available by reason of separate holding coil 150', through arm 154a of relay 154. With relay 150 energized the arm 150b will engage its lower contact and the motor start relay 172 will not be operated until, during the next game, the "not difficult" difficulty switch 144 is operated.

If the arm 132 engages a contact 136' at the end of the game, the relay 152 rather than relay 150 will be operated by coil 152", and held by coil 152' at operated position through the relay arm 154a. In this instance, the next game will select questions of medium difficulty through the switch 143.

In the event that the arm 132 engages one of the contacts 136", neither relay 150 nor 152 will be operated and the circuit to motor start relay 172 will be through the "very difficult" question selection switch 142.

The end of a game as evidenced by a positive potential on line 200 will also energize the coil 204' of relay 204. When this occurs, arm 204b of relay 204 disengages its contact and a positive potential previously appearing on a line 206 is removed. Arm 204b is connected to a source of positive potential through arm 29b of switch 29. When the potential on line 206 is removed, coil 208' of a current holding relay 208 (Figure 6A) is de-energized and a positive potential is no longer available at the "next question" switch 28. Accordingly, further operation of the switch 28b will not result in operation of the circuit.

Another result of the positive potential on line 200 will be the momentary operation of the previously mentioned relay 154. The coil 154' of relay 154 is provided with current through a capacitance 154C and resistance 154R, and the initial inrush of current will momentarily disengage arm 154a from its contact to remove the holding potential from whichever of relays 150 and 152 was held in during the just-finished game. In the event that arm 132 engages one of the contacts 136", then neither relay 150 nor 152 will have a holding circuit. However, as soon as the current inrush has subsided, the arm 154a will again engage its contact and a new holding circuit will be provided for either relay 150 or relay 152, or neither, depending on the position of switch arm 132 as a result of the game which is completed. The relay 154 may be polarized to operate only on the just-mentioned inrush current so that on subsequent discharge of capacitance 154C operation will not occur.

In the event that the game just completed has placed the arm 132 in contact with one of the contacts 136", a positive potential will be applied to a line 210 connected with contacts 136" and this will be applied through arm 204a of relay 204 and then over line 212 to a junction connecting this line with previously mentioned reset line 158. This has the same effect as though the coin or card operated start switch 27 had been closed and, accordingly, the system is set up for a free game. The resetting of the system comes about because as soon as a potential appears on line 200, the resulting potential available on lines 212 and 158 causes the switch arm 120 to disengage from contact 122" and, therefore, the relay coil 204' will be deenergized permitting its associated arm 204b to engage its lower contact to again apply potential on line 206 which will again close relay 208. Relay 204 may be of the slow release type, to insure that solenoids 118' and 130 are energized sufficiently long to permit the ratchet wheels to revolve to their reset positions.

To prevent a player from reading questions other than the selected questions as they move beneath the viewing window 14, the window cover 58 may be connected in the following manner: the cover 58 will be operated by a pivoted lever arrangement designated diagrammatically by reference character 220 (Figure 6A) which will be moved to an uncovered or viewing position only while a solenoid 222 is energized. The energization of solenoid 222 is dependent upon the motor control relay 162, the correct answer relay 186 and the incorrect answer relay 180 being deenergized. In other words, when any one of the just-mentioned relays is in its operated or energized position, there will be no current available for operating window cover solenoid 222 and the window will be closed. The circuit for solenoid 222 may be traced through line 224, line 226, relay arm 162d, line 228, relay arm 186d, line 230, and relay arm 180d to a source of positive potential. Because of relay 162, as long as the strip is moving, the window will be closed because of the open circuit at arm 162d. As soon as motor 52 is stopped, the circuit will be made at arm 162d and the cover will open where it will remain until either or both of relays 180 and 186 are energized by operation of the answer switches 16.

Another feature of the invention may be the inclusion of a timer for giving the player only a predetermined interval in which to select the proper answer. The timer is designated 232 and is operated by the armature 234 of a motor designated generally as 236. The field coil 238 of motor 236 is connected over line 226' with the previously mentioned line 226 which provides positive potential to the solenoid 222. In other words, the motor 226 will run just as long as the window cover is in the viewing position. Also driven by the motor 236 is a cam wheel 240 having a cam point 242 which is so adjusted as to close a switch 244 whenever the predetermined time interval is up. When switch 244 is closed, a positive potential is available on a line 246 and this is connected to the coil 186' of incorrect answer relay 180. This connection in effect provides an "incorrect" answer which closes the cover 58, stops the timer motor 236 and otherwise conditions the circuit as does an incorrect answer established by reason of the answer switches 16. The motor 236 may be of a type which automatically returns to its starting point whenever the field 238 is deenergized. Accordingly, the timer 232 will be reset for each question.

An arrangement for providing a coin or card return for each question answered correctly will now be described in detail. This circuit is established by moving the game-type control switch 29 to its upper position. In so doing line 202 will be disconnected from switch arm 29a, switch arm 29b will apply a positive potential to a line 250. Switch arm 29c will disconnect resetting solenoids 118' and 130', switch arm 29d will connect the coil 252' of a pay-off solenoid 252 to the previously mentioned line 192, switch arm 29e will connect to a stepping solenoid 254 and switch arm 29f will connect to a source of positive potential.

With the circuit thus re-arranged by movement of switch 29 each question answered either correctly or incorrectly, will result in a potential being applied to stepping solenoid 254. This connection will be available through switch arm 29e which, in turn, is connected with the arm 256a of an auxiliary incorrect answer relay 256. The coil 256' of relay 256 is connected to a negative source of potential through arm 258a of a free question relay 258 when the latter is in its non-operated position. If the coil 256 is otherwise provided with a positive potential over line 260 connected with the coil 180' of the incorrect answer relay 180, the coil 256' will be energized so long as the coil 258' of the free game relay 258 is not energized. The coil 258' of relay 258 is provided with a positive potential at one lead and the other lead is connected with the previously mentioned line 192 which connects with arm 180c of incorrect answer relay 180.

Whenever the correct answer relay 186 is operated a negative potential will be available on line 192 and this will have two results, namely, (1) coil 258' will be energized to prevent operation of relay 256 so that stepping solenoid 254 is not operated, and (2) the negative potential on line 192 will be applied through switch arm 29d to operate solenoid 252 to return the player's coin or card and at the same time this potential will be applied over line 262 to energize a free question stepping solenoid 264. The incorrect answer stepping solenoid 254 operates a ratchet wheel 266 which drives an incorrect answer commutator disc 268 which is provided with two conductive segments 270 and 272, these segments being electrically separated from one another. The segment 270 is connected (through suitable slip rings, not shown) over a line 270' to the coil 150' of previously mentioned "not difficult" relay 150. Segments 272 are connected over line 272' with the coil 152' of the previously mentioned "medium difficult" relay 152. The stepping solenoid 264 operates a ratchet wheel 274 which drives correct answer disc 276. Mounted on the disc 226 is a brush 278 which is arranged to engage either the segment 270 or the segment 272 of disc 278, depending on the relative angular position of the discs 268 and 276. The brush 278 is provided with a positive potential over line 250, through a suitable slip ring and to a source of positive potential through the arm 29b of switch 29. Relay 154 is continuously energized through arm 29b and line 251 to prevent hold-in of relays 150 and 152.

From the immediately preceding description it will be apparent that an incorrect answer signal (created either by reason of an incorrect selection, an attempt to operate two or more of the switches 16) or action of timer switch 244 will cause the disc 268 to be advanced while the disc 274 will not advance. If this sort of result continues the brush 278 will move in the direction of segment 270 and the result will be that the "not difficult" relay 150 will be operated to cause the circuit to select questions of lesser difficulty. On the other hand, the selection of a correct answer will advance the disc 276, but not the disc 268. In this instance, the brush 278 will move toward the segment 272 and whenever it comes in contact with this segment, the "medium difficulty" relay 152 will be energized to cause the circuit to select questions of medium difficulty. If the skill of the player results in the brush 278 moving beyond the segment 272, then neither of the relays 150 or 152 will be energized and the circuit will select questions which are very difficult. A stop 280 is provided on disc 268 to engage the brush 278 to cause the ratchet wheel 266 to override its pawl and carry the disc 268 with the disc 276 in the event that the player is consistently successful in answering nearly all of the questions. A similar stop 280' may be provided adjacent the end of segment 270 to carry the disc 276 with the disc 268 in the event that the converse is true, that is, that the player is steadily falling behind. The stop 280' will be located closely adjacent the segment 270 so that the brush 278 does not lose contact with segment 270.

The just-described arrangement of discs and stepping solenoids constitutes a ratio discriminator, which, in itself, forms an important part of my invention. This discriminator is obviously of general application in many varieties of apparatus, such as computing devices and the like.

In the "free question" type of game—when switch 29 is set to engage the upper contacts, operation of the start switch 27 is required for every question. The circuit for so doing is as follows:

When the question strip 46 stops a holding potential on line 199 will operate relay 300 to remove the positive potential on line 206 as derived through arm 300a of relay 300. The strip 46 cannot be again moved until switch 27 is operated. Operation of switch 27 opens a circuit at arm 27a in holding circuit 199. This permits a potential on line 206 to be reestablished through relay arm 300a. A switch 29' in "free question" operation will be closed to bridge switch 28. Therefore, operation of switch 27 causes a momentary potential on line 206 to operate relay 162. However, the holding circuit through line 198 remains, and the player cannot answer the same question again: he must operate switch 27 to move the strip 46 to the next question.

Form the foregoing description of my question and answer device, it will be clear that my invention provides a game of skill in which the difficulty increases and decreases according to the ability of the player.

The characteristic of my invention wherein a game of skill is of variable difficulty according to the results attained by the player will be further illustrated in connection with another embodiment of the invention. The embodiment about to be described relates to a so-called paddle-board game.

Referring to Figures 7 through 9, this game takes the form of a substantially flat rectangular table 310 supported in a casing 312. The table may slope gradually from either end to a low point along line 313 to cause a playing ball (described below) to come to rest at a given point. The player will look downwardly at the table 310 from above, and will stand at an end of the table designated 314. Adjacent the end 314 are a series of paddles 316a–d arranged with paddles 316a and 316d facing inwardly generally toward the center of the table and with the paddles 316b and c substantially parallel to the end 314. The construction of the paddles may be best understood with reference to Figures 8 and 9. Each paddle will be hinged as at 318 at the edge of the paddle facing the center of the table 310. The paddle will be generally in the form of a half round strip having provision at some convenient point along its length for connection to a operating rod 320 extending from a solenoid 322. When the solenoid is energized the operating arm 320 will move upwardly and the paddle will assume an up position as shown in chain line in Figure 9. There will be one solenoid for each of the paddles 316a–d.

The end 314 will be further provided with two conductive strips, one strip 324 being mounted on the end wall and the other strip 326 being embedded in the table 310. The strips 324 and 326 extend completely across the width of the table 310 and are so positioned that a metal ball 328 when rolled against the end 314 of the table will be in contact with both of the strips 324 and 326 and will be capable of completing an electric circuit therebetween.

The opposite end of the table designated as 330 is similarly provided with conductive strips 332 and 334 located in the end wall 330 and table 310, respectively. These strips are similarly positioned to permit ball 328 to complete a circuit therebetween at such times as the ball is rolled against this end of the table.

Adjacent end 330 there is also provided a set of solenoid-operated paddles similar to those mentioned in connection with the opposite end of the table. In this case, as shown best in Figure 7, two paddles 336 and 338 are located near the edges of the table and face inwardly generally toward the center of the table. A single central paddle 340 extends across the remaining central portion of the table and this paddle is generally parallel to the table end 330.

The paddles adjacent the end 330 are further characterized by the provision of closely spaced conductive strips 342 immediately forward of paddle 336, conductive strips 344 forward of paddle 340 and strips 346 forward of paddle 338. As best shown in Figure 8, these conductive strips are embedded in the table as are strips 326 and 334 so that the tops of the strips are just flush with the top of table 310. The strips 342, 344 and 346 are actually mounted extremely close together so that the ball 328 when rolling across the strip will complete an electrical circuit therebetween. In the drawings, the strips are shown as spaced a greater distance apart than would be permissible. However, they are so shown for clarity and the proper positions of the strips will be well understood from the foregoing. To further insure contact, the portion of table 310 between the strips may be recessed slightly.

The game is further characterized by provision of a rotatable disc 348 having its upper surface just flush with the top of table 310. The disc 348 is mounted on the shaft of a motor 350 which may be energized under certain conditions to rapidly rotate the disc 348.

The paddle board game is played in the following manner: The player will stand adjacent end 314 of the game and from that position will be able to look down at the table 10 and will be able to operate with the fingers of the right hand a push button switch 352 for controlling the paddle 316d and a push button switch 354 for operating the paddle 316c. The fingers of the left hand will be able to operate a push button switch 356 for operating the paddle 316a and also a push button switch 358 for operating the paddle 316b. The game will be started by inserting a coin or card (if required) in a start switch and the metal ball 328 will be positioned just forward of one of the "player's paddles" 316a–d. A suitable position is shown at 328'. The ball will come to rest in this position because of the previously mentioned low point line 313, and the fact that the table may be slightly tilted sidewise. The switch 356 may then be closed and the solenoid 322 associated with paddle 316a will be rapidly rotated into the chain line position shown in Figure 9. The paddle in rising will strike the ball 328 and drive it forcefully along the table toward the end 330. Depending on the condition of a circuit (to be described) associated with the solenoids 322 and various conductive strips, the paddle 340 or 338, depending on the precise path of the ball, may or may not be operated to return the ball. If a paddle does return the ball, it will be up to the player to operate whichever of paddles 316a–d the ball is approaching if the ball is to be returned. If the player is not quick enough to actuate the correct paddle, the ball will pass over the paddle and, in rebounding from the end wall, will complete a circuit between strips 324 and 326. Doing so will register a "point" for the game. Assuming that the ball has returned, if the paddle toward which the ball moves does not respond upon completion of a circuit between the two conductive strips immediately before the paddle the ball will continue and complete a circuit between the conductive strips 334 and 332. This will register a point for the player.

Once the game is underway, the ball will be moving quite rapidly in an unpredictable path, and the skill exercised by the player is in seeing which of the paddles 316a–d should be operated, and in operating the proper paddle at the correct instant.

Suitable circuits for interconnecting the paddles, conductive strips, and the motor 350 for increasing the difficulty of the game depending on the player's skill will now be described.

Referring now to Figure 10, the various paddles, conductive strips, switches and motor 350 are correspondingly designated in this figure as in Figures 7–9. However, the components are only diagrammatically illustrated in Figure 10.

The game will be started by momentarily closing a coin or card operated switch 380. This will energize the resetting solenoid 382 of a stepping switch designated generally as 384 and will also energize the resetting solenoid 386 of a second stepping switch designated generally as 388. Open energization of the just-mentioned resetting relays, the stepping switches 384 and 388 will return to their starting positions under suitable spring action, so that the elements 384′ and 384″ of switch 384 and arm 388′ of switch 388 will contact the lowermost of a series of contacts associated with each of the just-mentioned switches. The contacts associated with element 384′ are designated as 390; those with arm 384″ as 392 and those with element 388′ as 394. The contacts 392 and 394 will be connected to groups of score indicating lamps on a suitable panel associated with the game. The lamps connected with contactors 392 indicate the total number of points received by both the "game" and "player," while the lamps connected to contacts 394 will indicate only the points credited to the player.

As soon as element 384′ contacts any one of contacts 390 except the uppermost contact 390′ a positive potential will be available over a line 396 and a capacitance 398 connected with the line 396 through resistor 400 will be charged. The opposite side of capacitance 398 is connected over a line 402 to carry current to the previously mentioned control switches 352, 354, 356 and 358. Whenever any one of these switches is closed, a current impulse will flow through the associated capacitance as capacitance 398 discharges.

To prevent a player from pushing all of the just-mentioned switches simultaneously in an effort to return the ball, the switches are interlocked, so that only one switch at a time may be operated. This is accomplished in the following manner: switches 352 and 354 located together at one side of the game are interconnected by means of a suitable rocking beam 404 which is pivoted at 406. Accordingly, only one or the other of the switches 352 or 354 can be depressed to bridge between its two contacts. The switches 356 and 358 are similarly connected by a rocking beam 408. These rocking beams will normally be resiliently retained in a central portion, as shown in Figure 10. The rocking beam 404 is conductive and provided with a brush 410 which is normally in contact with a narrow conductive step 412. The line 402 is connected with the beam 404 and the beam 408 is electrically connected over line 414 with the conductive strip 412. Accordingly, if either of switches 352 or 354 are operated, the brush 410 will move off the strip 412 and no current may flow through the switches 356, 358, even if the player should operate them. On the other hand, if switches 352, 354 are not moved, the player may then operate one, but only one, of the switches 356, 358.

The previously mentioned solenoids 322 are each connected to one of the switches 352 etc., according to the above description of Figures 7–9. That is, switch 352 controls paddle 316d, switch 354 controls paddle 316c, switch 356 controls paddle 316a and switch 358 controls paddle 316b. Whenever any one of the push button switches is closed, a current inrush, as described above, will occur. Accordingly, the selected solenoid 322 will be momentarily energized and the corresponding player's paddle will be operated to return the ball. The capacitance 398 will soon be discharged, however, and the current flow will stop, permitting the operated paddle to return to its normal position.

Whenever the ball 328 bridges the conductive strips 324 and 326 at the player's end of the game, this is a point in favor of the machine. Strip 326 is connected to a source of positive potential and bridging of the strips by the ball will energize a machine point relay 416. Arm 416a of this relay will serve to hold the relay closed momentarily until the charge established on capacitance 418 is drained off. While the relay 416 is energized to arm 416c will serve to energize a stepping solenoid 422 which will advance at the stepping switch 384′. This will move the switch arm 384″ for one contact to indicate that one point has been scored. In addition, the arm 416b of relay 416 will energize a stepping solenoid 424 which operates a ratio discriminator disc 426 counterclockwise as viewed in Figure 10.

Whenever the ball 328 bridges the conductive strips 332, 334 at the end of the game opposite the player, a player point relay 428 will be energized. Arm 428a of this relay will serve to retain the relay in energized condition until a charge created in a capacitance 430 is discharged.

Every time the ball 328 bridges one of the pairs of conductor strips 342, 344 or 346, an associated relay 342′, 344′ or 346′ is energized. Referring to relay 342′ as an example of each of these three relays, the arm 342a will serve to provide a momentary holding circuit when the ball is moving toward the associated paddle. This circuit will hold while charge is drained through capacitance resistor 436. When the relay 342 drops open capacitance 434 will be again charged through the lower contact of arm 342a.

Arm 342b of relay 342′ (and the corresponding arm of relays 344, 346) serves to enable one side of a circuit to solenoid 322 which operates the machine paddle 336. The arm 342c of relay 342′ (and correspondingly for the arms of relays 344′, 346′) serves to energize a stepping solenoid 438 which operates a difficulty selection device which will be described below.

Another function of the player's point relay 428 is that the arm 428b thereof applies a negative potential to a line 440. The potential on line 440 energizes the stepping solenoid 442 of stepping switch 388 and also energizes a stepping solenoid 444 which deenergizes a second ratio discriminator disc 446. For every point gained by the player the stepping switch 388 will indicate on the score panel the number of points won.

The disc 446 carries a brush 448 which engages one of three electrically conductive segments 450, 452 or 454, depending on the relative positions of the ratio discriminator discs 426 and 446.

The difficulty of the game is controlled in the following manner: A ratchet wheel 456 on which the previously mentioned stepping solenoid 438 operates is connected to drive three segmented difficulty control discs 458, 460 and 462. Each of these discs is made up of a different number of insulating segments separating conductive segments. In the case of disc 462, there may be a very low number of insulating segments and only one is illustrated. The number of insulating segments in disc 460 may be increased and four are illustrated. In case of disc 458 there are a great number of insulating segments and six are illustrated. Associated with each of the discs 458, 460 and 462 are spaced brushes designated 458′ and 458″, etc.

The brushes 458′, etc., may ride on one side of the discs and the brushes 458″, etc., may ride on the other side of the discs and directly opposite the first mentioned brushes. Accordingly, the brushes are positioned so that they are engaging either a conducting segment or an insulating segment. When engaging a conductive segment, an electric circuit will be completed between the brushes.

When a player is quite skillful and is preventing the ball from reaching the "goal" conductors 324, 326 the ratio discriminator stepping solenoid 444 will advance brush 448 to eventually engage segment 450 of disc 426, as shown in Figure 10. While the brush is on this segment, a circuit will be completed from the solenoids 322 of machine paddles 336, 340 and 348, through the disc 462 (if brushes 462', 462" are bridged), through segment 450 and through a slip ring brush 464 and to a source of negative potential. Accordingly, assuming, for example, that the sole insulating segment occupies only a very few degrees of the disc, the game will be very difficult—the ball being returned practically every time. To additionally increase the difficulty the motor 350 is energized, with the result that every time the ball passes over the disc it is veered from its path.

If the player is unable to cope with this degree of difficulty, the machine will receive "points" by reason of the ball contacting the conductors 324, 326. This will cause the ratio discriminator disc 426 to advance relative to the disc 446. Accordingly, the brush 448 will move toward segment 452, where it will eventually engage stop 426' to thereafter carry disc 446. As brush 448 moves from segment to segment, difficulty discs 460 and 458 will come into use. When the player's skill increases, the opposite will be true, and stop 426' will cause disc 426 to be carried with disc 446.

From the foregoing description of my novel paddleboard game, it will be apparent that this game is adaptable for providing a free game upon receiving a high score, just as in the case of my question-and-answer device.

An additional species of my invention will now be described in connection with a target game which embodies means for increasing the difficulty of the game in accordance with the player's skill. Referring first to Figures 11 and 12, a gun 510 is arranged to project a narrow beam of light designated at 512 to impinge upon the lens of a light-sensitive target device 514 whenever a player handling the gun is successful in aiming the gun. The target 514 is mounted in a casing 516, which is arranged to selectively move in a random course combining horizontal and vertical movement. In greater detail, there is provided a first upright 518 and a second upright 520 extending from the floor F to suitable supports 522 and 524 attached to the overhead structure of the room in which the device is installed. Alternatively, the uprights 518 and 522 may be suitably braced if no overhead structure is available. Also extending between the floor F and overheads 524 is a screw-threaded member 526 which is fixed against rotation relative to the support 524. Threaded column 526 passes through a motor casing 528 which contains an electric motor which drives a gear or pulley or the like having a threaded hub to receive the column 526. Accordingly, as the motor is energized in the first direction, the casing 528 will be forced to rise along the member 526 and upright 520. When the motor is reversed, the casing 528 will move in the opposite direction. The casing 528 is provided with a projecting arm 530 provided with a suitable aperture for receiving the upright 520.

Cooperating with the upright 518 is a U-shaped bracket 532 having a lower horizontal arm 534 and an upper horizontal arm 536. The arms 534 and 536 are provided with suitable apertures for receiving the upright 518.

Extending between bracket 532 and the previously mentioned motor casing 528 is a horizontal threaded member 538 which is fixedly secured against rotation relative to the bracket 532 and casing 528. The column 538 passes through the previously mentioned casing 516 which contains the target device 514. In addition, the casing 516 contains a motor and threaded gear or the like similar to that of casing 528. Accordingly, the casing 516 may be moved to the left or right upon operation of the motor first in one direction and then in the other.

A tie bar 540 is also provided with the bracket 532 and upright 542 extending from the casing 528. This tie bar passes through an arm 544 extending from casing 516 to retain the latter in a constant vertical position, and the tie bar 540 also serves the purpose of providing a rigid structure between the bracket 532 and casing 528. Accordingly, as the motor in casing 528 is operated to move the casing upwardly and downwardly, the bracket 532 follows this motion.

The casing 528 is further provided with an upper limit switch 546 and a lower limit switch 548. As will be described more fully below, these limit switches engage the fixed structure at either end of the upper and downward travel of the casing 528 to reverse the motor within casing 528. Similarly, the casing 516 is provided with a right-hand limit switch 550 and a left-hand limit switch 552 for reversing the motor in casing 516 whenever the casing reaches the extreme possible left-hand and right-hand positions along the threaded column 538.

Suitable circuits for use with the target game will now be described in connection with Figure 13. In this figure the "vertical" motor within casing 528 is designated 528' and the "horizontal" motor is designated 516'. A switch to be operated by the trigger of gun 510 is designated as 560, and a lamp within gun 510 which will be energized by operation of the trigger switch is designated 562.

The circuit operates in the following manner: A coin or card operated start switch 564 is first momentarily closed to start the game. The closing of this switch energizes a reset solenoid 566 of a "total shots" stepping switch designated generally as 568. The closing switch 564 also energizes the resetting solenoid 570 of a "total hits" stepping switch designated generally as 572. When the resetting solenoids 566 and 570 are energized, switch arms 574 and 576 of stepping switch 568 will be returned to their starting position and also the switch arm 578 of switch 572 will be returned to its starting position.

The switch arms 574 and 578 are intended for connection to a convenient panel board for indicating the total number of operations of the gun trigger and the total number of successful hits, respectively.

The player will now operate the trigger switch 560 for his first shot. Closing this switch will operate a relay 586 and the arm 586a of this relay will apply a positive potential to a line 588. One use of this potential will be to energize lamp 562 to create the previously mentioned beam of light 512. Another use of the potential on line 588 will be to energize the stepping relay 590 of stepping switch 568 to provide indication that one shot has been fired. The relay 586 will be energized only momentarily even if the trigger switch 560 is held closed because of the capacitance 592 and resistor 594 connected with the switch 560. As will be well understood by those skilled in the art, sufficient current to operate relay 566 will only occur while the condenser 592 discharges. The greater amount of the potential drop between the positive and negative source will then appear across resistor 594 and relay 586 will open.

If the player has been successful in having the light beam 512 impinge upon the light sensitive target 514, designated in Figure 13 as 514', a relay 596 will be energized and arm 596a will apply a positive potential to line 598. This potential will serve to energize the stepping relay 600 to operate the arm 578 of switch 572 to indicate that a successful hit has been obtained. In addition, the potential on line 598 will operate a stepping solenoid 602 which operates a "hit" disc 604 of a difficulty ratio discriminator designated generally as 606.

If the operation of the trigger switch 560 did not result in a successful hit, the relay 596 will not have been operated and the relay arm 596a will remain engaged with a line 608 to operate a "miss" stepping solenoid 610 which operates a disc 612 of the ratio discriminator 606.

Discriminator discs 604 and 612 are driven by ratchet wheels 604' and 612', respectively. Where it is expected that there will be a great many more misses than hits or vice-versa, the diameters of the ratchet wheels 604 and 612' may be varied as required to regulate the average difficulty established by the game.

The discriminator disc 604 is provided with a brush 614 which extends to the disc 612 to engage one of three conductive segments 612a, 612b or 612c. A positive potential will be available on a line 616 and this potential will be further applied through a slip ring brush 618, so that the potential is finally applied to whichever of the segments 612a–c with which the brush 614 is in contact.

Assuming first that the brush 614 is in contact with segment 612a, the relay 584 will be operated. Operation of relay 584 will result in horizontol motor 516' being energized through arms 584a and 584b. The potentials applied to arms 584a and 584b are derived from the contacts of a horizontal reversing relay 620 having a first coil 620' controlled by the horizontal right-hand limit switch 550 and having a second coil 620" controlled by the left-hand horizontal limit switch 552. Relay 620 may be of an over-center type so that energization of coil 620 will leave the arms 620a and 620b in their upper position until the upper relay coil 620" is energized to return the arms to their lower position.

If the player's skill increases to move the brush 614 into contact with discs 612b, the potential available on the brush 614 will be transferred to energize the relay 582. Relay 582 is similarly connected with the horizontal motor 516' except that in this case resistance 622 will be inserted in the motor field circuit to decrease the field current and thus increase the motor speed. As a result, the target 514 will move right and left across the target area at a much greater speed and thus increase the difficulty of the game.

If the player continues to be successful, the brush 614 will move to engage disc segment 612c and relay 580 will be operated. Arms 580a and 580b or relay 580 control motor 516 in a manner similar to that of relay 582, the resistance 622 being included in the field circuit to provide high speed operation of motor 516. In addition, arms 580c and 580d of relay 580 permit operation of the vertical motor 528. Motor 528 is further controlled by the lower limit switch 548 and the upper limit switch 546, the control being through reversing relay 624 having an upper coil 624' controlled by switch 548 and a lower coil 624" controlled by switch 546. When relay 580 is operated, the result is that the target 514 describes an erratic path over the target area.

A suitable stop 612' may be provided on disc 612 to prevent increasing player skill from having the brush 614 go back into contact with the segment 612a, which would render the game less difficult.

From the foregoing description of my target game device, it will be apparent that this game is adaptable to provide either a free game or a free shot, just as my question and answer device provides a free game or a free question.

In the foregoing described embodiments of my invention, it will be noted that the so-called ratio discriminator in each case changes the relative positions of the two discriminator discs an equal or predetermined amount upon the occurrence of each input impulse. For example, the ratio discriminator illustrated in Figure 6B, the rate of change of relative positions of the discs are equal in both directions inasmuch as the ratchet wheel 266 is of the same diameter and carries the same number of teeth as does the ratchet wheel 274. In the case of the paddle board game, it has been explained that the magnitude of the position may be different where the ratchet wheels are of different size. Further, with regard to the target game, the ratchet wheels of the ratio discriminator are again shown to be of different size. It will, furthermore, be understood that the ratchet wheels of the question and answer device may be of different size.

Furthermore, in each of the ratio discriminators above illustrated, it will be understood that the "dwell" period for each classification of difficulty may be predetermined by the relative length of the conductive segments involved on the one disc, these segments being the ones which cooperate with the discriminator brush carried by one of the discriminator discs.

It is possible, according to arrangements which will now be described, to actually vary the ratio of the ratio discriminator. That is, either whether the ratchet wheels are of the same size, or are of different sizes, or the conductive segments are of different lengths, the ratio may further be caused to vary by replacing at least one of the ratchet wheels by other means for advancing the associated ratio disc.

Referring now to Figure 14, there is illustrated a ratio discriminator having a variable ratio function. In this figure, 710 designates ratio discriminator disc carrying a brush 712 and 714 designates the second ratio discriminator disc which may carry conductive segments. It will be understood that the discs 710 and 714 are analogous and may be substituted for the two discriminator discs in each of the three above-described embodiments of my invention and in all other embodiments of my invention which may employ ratio discriminators.

The disc 714 of Figure 14 may be moved by means of ratchet wheel 716 and ratchet pawl 718 under control of ratchet pawl solenoid 720. Solenoid 720 may correspond to and replace disc 268 of the question and answer game (Figure 6B); disc 426 of the paddle board game (Figure 10); or disc 612 of the target game.

The brush carrying disc 710 (which has its obvious equivalents in the above described embodiments of my invention) is in this case arranged to be advanced by a motor-gear train unit 722. Unit 722 may be a synchronous motor combined with any conventional gear reduction unit. The gear reduction may be such as to permit the rotation of disc 710 when the brush 712 is moved by a stop on disc 714. Or, as an alternative, an overrunning clutch may be provided in the unit 722.

When an impulse indicating a score is available from the associated game circuits over line 723, this impulse will be employed to energize the coil 724' of the control relay 724. The impulse which energizes coil 724 will cause relay arm 724a to pick up and apply a positive holding potential to the coil 724'. This potential is obtained over a line 726 and through a cam-operated switch 728.

The cam 728' of the cam-operated switch 728 is rotated by means of a motor 730 which receives current through the switch arm 728a and relay arm 724a. The current which flows through motor 730 also flows through a regulating rheostat 732 which is employed to control the speed at which motor 730 revolves. The motor 730 is further provided with a spring device (not shown) which will return the motor armature and therefore the cam 728' to a reference starting point each time the current through the motor is interrupted.

In tracing the operation of the circuit of Figure 14, it will first be assumed that relay coil 724' is not energized and therefore relay 724 is open. An impulse received, as for example, by the solenoid 264 in Figure 6B, will arrive over line 734 and will close relay 724 and this will hold the relay closed and will operate motor 730 until the cam switch 728 opens. During this interval, a connection between line 726 and motor 722 over line 734 will cause motor 722 to advance the discriminator disc 710 a given amount. The magnitude of the movement of the disc 710 will depend upon the setting of rheostat 732, since the latter controls the speed at which motor 730 revolves, and therefore the time interval during which motor 722 runs. As soon as cam-operated switch 728 opens, the complete circuit will be deenergized, motor 722 will stop and relay 724 will drop out. The result is that no further functioning of the circuit will take place until the occurrence of another impulse on the input line.

An indicating dial device 736 may be connected with the means for adjusting the rheostat 732. Accordingly, the player may be advised of the setting of the variable ratio feature.

From the foregoing, it will be understood that when a ratio discriminator as shown in Figure 14 is inserted into any one of the previously described variable difficulty devices, adjustment of the rheostat 732 will have an effect on the system analogous to changing the diameter or the number of teeth on one of the ratchet wheels of the earlier described ratio discriminators. It is also clearly possible to further extend the ratio discriminator circuit so that the rheostat 732 is automatically responsive to the success of the operator in controlling the devices.

In operating variable difficulty devices in accordance with my invention, it may be desirable to provide a preliminary orientation period so that the operator can judge his skill before operating the game for points. It may be particularly desirable to provide such a preliminary orientation period where a control is provided as in the variable ratio discriminator of Figure 14. That is, the player can use the results of the preliminary orientation period to judge the setting of the rheostat 732 of Figure 14, and the dial 736 will advise the player of his skill. A suitable circuit for providing a preliminary orientation period will now be described with reference to Figure 15.

While the circuit of Figure 15 has application to all of the previously described embodiments of my invention, the circuit will be explained in detail as it applies to my target game. Accordingly, Figure 15 is to be closely compared with Figure 13. In Figure 15 a manually operable switch 810 is provided with switch arms 810*a*, 810*b*, 810*c*, 810*d* and 810*e*. This switch may be set in an upper position as viewed in Figure 15 to permit the target game to be operated as is explained above in connection with Figure 13. When the switch 810 is set in its lower position, the game may then be operated for a predetermined time period to provide a preliminary orientation period.

With switch 810 in its upper position, the switch arm 810*b* may connect line 588 of Figure 13 to the solenoid 590 and other circuits as in Figure 13; the switch arm 810*c* may connect the line 598 to solenoids 600 and 602 as in Figure 13, and switch arm 810*e* may complete an otherwise open circuit in line 616 of Figure 13. Therefore, with switch 810 in its upward position the circuit of Figure 13 will be reconstituted and will open accordingly.

When the switch 810 is moved to its lower position, switch arm 810*a* will apply a positive potential to a line 812 whenever switch 564 of Figure 13 is operated; switch arm 810*b* will disconnect line 588 from solenoid 590; switch arm 810*c* will disconnect line 598 from solenoids 600 and 602, and switch arm 810*d* will connect line 598 with a hit-indicating lamp 814.

When switch 810 is in its lower position the potential momentarily available on line 812 when coin-operated switch 564 is closed will serve to start a time interval motor 816 so that it will move a switch cam 818 far enough to cause a cam follower 820 to rise out of a cam detent 822 and close a switch 824. Switch 824 is connected to a source of positive potential as at 826 and as soon as switch 824 closes the potential from 826 will be available over line 828 to maintain the motor 816 in operation, regardless of the opening of switch 564. The motor 816 will continue to revolve until the cam detent 822 returns to the position of the cam follower 820, whereupon the follower 820 will drop into the detent 822 and switch 824 will be open to stop the motor 816. In the meanwhile, the positive potential available at point 826 will have been applied over line 830 to supply the line 616 of Figure 13 with positive potential, permitting the player to operate the game during the preliminary orientation period established by cam 818.

An indicating dial 832 may be connected with the motor 816 and cam 818 communicates to the player how rapidly the preliminary orientation period is passing.

From the immediately preceding description, it will be clear how the preliminary orientation period circuit may be incorporated into the embodiments of my invention other than the target game.

When the rheostat 732 and dial 736 are available the operator of the device is able to select the average skillfullness of his opponent (the game device). Such selection is of advantage in the development of a physical skill, that is, some persons can develop a certain phase of their technique when the opponent is highly skilled, while another phase of their skill can be most readily developed when the opponent is equally or even less skilled.

Dial 736 is accordingly of great advantage to a player since this dial advises him as to how skilled the device is as compared to himself. It will be understood that the dial 736 may be visible to the player, even if the rheostat 732 is not available to the player. In some installations the rheostat may (if provided) be available only to owner of the device.

In concluding this specification I wish to repeat my intention that it is to be understood that the various features of each of the several phases of my herein described invention may be combined in various combinations, as is clear from the foregoing.

I claim:

1. In a device involving the exercise of skill in the operation thereof, means operable to manually control the device, means to automatically control the difficulty of operation of the device, means arranged to be actuated in response to the operation of the device by said manual control means, the operation actuated means being arranged to classify the operations as being successful or unsuccessful, and means responsive to the operation actuated means and connected with the difficulty controlling means for increasing the difficulty of operation in response to an increase in the number of successful operations in relation to the number of unsuccessful operations and for decreasing the difficulty of operation in response to an increase in the number of unsuccessful operations in relation to the number of successful operations.

2. Apparatus as in claim 1 wherein the difficulty of operation is subject to alteration following every discrete operation of the operation control means.

3. Apparatus as in claim 1 wherein the difficulty of operation is subject to alteration following a predetermined group of discrete operations of the control means.

4. Apparatus as in claim 1 wherein the difficulty alteration means comprises a ratio discriminator.

5. Apparatus as in claim 1 wherein the difficulty alteration means comprises a ratio discriminator, the ratio discriminator having first means responsive to signals representing successful operations and having second means responsive to unsuccessful operations, the first and second signal responsive means being arranged to be stepped relative to each other in accordance with the number of received signals representing successful and unsuccessful results, respectively.

6. Apparatus as in claim 5 wherein the first and second means are arranged to be stepped in unequal increments.

7. Apparatus as in claim 6 wherein timer means are provided for adjusting the relative magnitude of the stepping increments to thereby vary the ratio of the ratio discriminator.

8. Apparatus as in claim 1 and further including timer means for providing a preliminary orientation period of operation before the difficulty controlling means is operable.

9. A ratio discriminator for use in indicating the comparative number of occurrences of signals comprising, a first movable member, a second movable member, means for moving the first member in response to signals of a first class, means for moving the second member in response to signals of a second class, the means for moving the first and second members being arranged to move the members in increments of magnitude unequal to each other, the second member being segmented, and means mounted for movement with the first member and arranged to engage the second member at one of the segments thereof, the arrangement being such that relative movement between the first and second members causes the engaging means to engage different ones of the segments of the second member for representing the accumulated relative movement between the first and second members.

10. A device as in claim 9 wherein means is provided for adjusting the magnitude of the increments of movement, the adjusting means comprising timer means responsive to received signals to move one of the members through an increment of a magnitude different from the movement of the other member in response to activating signals.

11. A device involving skill in the operation thereof comprising means for presenting questions to be answered, means for permitting an operator to designate answers to presented questions, means responsive to the answer designating means for determining if a designated answer is correct or incorrect, means responsive to the correctness determining means for controlling the question presentation means, the question presentation control means being arranged to control the question presentation means to cause the latter to present questions of increased difficulty as the correctness designating means indicates correct answers, and vice-versa.

12. A device involving skill in the operation thereof comprising a movable member bearing questions and answers in first portions of the member, there being at least one correct answer and at least one incorrect answer, second portions of the member each associated with one of the first portions, the second portions bearing controlling indicia, means operable to designate a selected answer, means responsive to the answer designating means for determining whether the selected answer is correct or incorrect, means for moving the movable member to present another question for answering, and means for controlling the moving means to select a question of predetermined difficulty, the difficulty controlling means being responsive to the correctness determining means.

13. A device involving skill in the operation thereof comprising means for presenting questions to be answered, means for permitting an operator to designate answers to presented questions, means responsive to the answer designating means for determining if a designated answer is correct or incorrect, means responsive to the correctness determining means for controlling the question presentation means following each operation of the answer designating means, the question presentation control means being arranged to control the question presentation means to cause the latter to present questions of increased difficulty as the correctness designating means indicates correct answers, and vice-versa.

14. A device as in claim 13 wherein the question presentation control means is responsive to a predetermined level of success in answering questions to enable operation of the movable member to present additional questions following completion of a first predetermined number of questions.

15. A device involving skill in the operation thereof comprising means for presenting questions to be answered, means for permitting an operator to designate answers to presented questions, means responsive to the answer designating means for determining if a designated answer is correct or incorrect, means responsive to the correctness determining means for controlling the question presentation means following each predetermined group of operations of the answer designating means, the question presentation control means being arranged to control the question presentation means to cause the latter to present questions of increased difficulty as the correctness designating means indicates correct answers, and vice-versa.

16. A device as in claim 15 wherein the question presentation control means is responsive to a predetermined level of success in answering a question to enable operation of the movable member to present an additional question following such question.

17. A device involving skill in the operation thereof comprising, means for presenting questions to be answered comprising a movable strip having first portions bearing questions and suggestive answers and second portions having tracks having apertures indicating question subject matter, difficulty and correct answers, means for moving the strip, switch means for operation by the said apertures in the strip, means including switch means for resetting the device to permit answering questions, switch means for actuating question presentation means for actuating the strip moving means, switch means for designating a correct answer to a presented question, means responsive to the answer designating switch means for determining if a designated answer is correct or incorrect, and means responsive to the correctness determining means for determining the difficulty of questions to be presented for answering, the just mentioned means being connected to control circuits through the said aperture operated switches operable in the tracks of the strip devoted to indicating difficulty.

18. A device as in claim 17 wherein the difficulty determining means is responsive to the accumulated answering of a group of questions to determine a predetermined level of difficulty for a following group of questions.

19. A device as in claim 18 wherein means comprising the difficulty determining means is arranged to automatically enable the resetting means to provide an additional set of questions whenever the difficulty determining means indicates a predetermined high level of success in answering a group of questions correctly.

20. A device as in claim 17 wherein the difficulty determining means is responsive to the answering of discrete questions to determine a predetermined level of difficulty for a following question.

21. A device as in claim 20 wherein means comprising the difficulty determining means is arranged to automatically enable the resetting means to provide an additional question whenever the difficulty determining means indicates a predetermined high level of success in answering a previous question correctly.

22. In a device involving the exercise of skill in the operation thereof, means operable to manually control the device, means to automatically control the difficulty of operation of the device, means arranged to be actuated in response to the operation of the device by said manual control means, the operation actuated means being arranged to classify the operations as being sucessful or unsuccessful, and means responsive to the operation actuated means and connected with the difficulty controlling means for decreasing the difficulty of operation in response to an increase in the number of unsuccessful operations in relation to the number of successful operations.

References Cited in the file of this patent
UNITED STATES PATENTS

| | | |
|---|---|---|
| 2,079,429 | Tauschek | May 4, 1937 |
| 2,187,422 | Henry | Jan. 16, 1940 |
| 2,333,758 | Xenis et al. | Nov. 9, 1943 |